United States Patent [19]

Regitz

[11] 3,765,000

[45] Oct. 9, 1973

[54] MEMORY STORAGE CELL WITH SINGLE SELECTION LINE AND SINGLE INPUT/OUTPUT LINE

[75] Inventor: William M. Regitz, Cupertino, Calif.

[73] Assignee: Honeywell Information Systems, Inc., Waltham, Mass.

[22] Filed: Nov. 3, 1971

[21] Appl. No.: 196,303

[52] U.S. Cl. ........... 340/173 CA, 307/238, 307/304
[51] Int. Cl. .... G11c 11/24, G11c 11/40, G11c 7/00
[58] Field of Search .............. 340/173 CA; 307/238, 307/304; 320/1

[56] References Cited

UNITED STATES PATENTS 3,585,613 6/1971 Palfi ............................ 340/173 CA
3,665,422 5/1972 McCoy .............................. 307/238

*Primary Examiner*—Stanley M. Urynowicz, Jr.
*Assistant Examiner*—Stuart Hecker
*Attorney*—Ronald T. Reiling et al.

[57] ABSTRACT

An improved electronic memory storage element including three transistors of the field effect type arranged to provide for the binary storage of data. The element is basically coupled with a single selection line and a single input/output line.

20 Claims, 3 Drawing Figures

MEMORY STORAGE CELL WITH SINGLE SELECTION LINE AND SINGLE INPUT/OUTPUT LINE

BACKGROUND OF THE INVENTION

The present invention relates generally to electronic memory storage devices and more particularly to memory elements that employ transistors, preferably of the field effect type.

An electronic memory storage device that stores a single binary digit, or bit, is known as a "cell." The size of transistor memory cells is primarily determined by the number of transitors per cell and the number of interconnections per cell. The patent application of W. Regitz for "Electronic Memory Storage Element," Ser. No. 196,305 filed Nov. 4, 1971, which is a continuation application of patent application, Ser. No. 808,421, filed Mar. 19, 1969, now abandoned, discloses a cell employing just three transitors interconnected with a single selection line, a read bit line, a write line, and a reference potential line. The United States patent of T. Palfi for "Field Effect Transistors Capacitor Storage Cell," U.S. Pat. No. 3,585,613, filed Aug. 27, 1969 and issued June 15, 1971 discloses a cell also employing three transistors, interconnected with two selection lines, a single input/output line and a refernece potential line. Each of these above-mentioned cases utilizes three transistors and four interconnections. A reduction in the size of the cell may be achieved by reducing the number of interconnections by one.

It is accordingly a primary object of the invention to provide a memory cell having three tansistors and three interconnection lines, one for selection another for reading and writing, and another for providing a reference potential.

SUMMARY OF THE INVENTION

The purposes and objects of the invention are satisfied by providing a memory cell having first, second, and third transistors, each having control inputs and outputs. The second and third transistor's outputs are connected in series circuit between a first reference line and an input/output line. The first and third transistors receive a common selection input on their control inputs. The first transistor's outputs are coupled between the input/output line and the control input of the second transistor. A storage capacitor is coupled between the control input of the second transistor an a first potential.

BRIEF DESCRIPTION OF THE DRAWINGS

The advantages of the foregoing configurations of the invention will become more apparent upon reading the accompanying detailed description in connection with the drawings, in which.

DETAILED DESCRIPTION OF THE PREFERRED EMBODIMENTS

Although it is not contemplated that the present invention be limited to particular types of transistors, illustratively the circuit in the sole figure employs p-channel, MOS (Metal Oxide Semi-conductor) field effect transistors of silicon-gate field effect transistors. A full understanding of such transistors may be ascertained by reference to the book entitled "MOSFET in Circuit Design," by Robert H. Crawford, Texas Instrument Electronics Series, McGraw-Hill Book Company, 1967. Reference to the article entitled "Silicon-gate Technology" appearing at pages 28 through 35 of the publication IEEE Spectrum, Volume 6, Number 10; October, 1969 will be of further aid in such understanding.

Briefly, however, the characteristics of such devices are that the impedance between a drain and a source electrode is regulated by the voltage at a gate electrode. The voltage impressed on the gate electrode determines the value of the current flowing in the transistor. For example, if the source and the transistor's substrate are grounded and the drain is at a negative potential, current commences to flow between the drain and the source electrodes when the gate voltage is more negative than a predetermined negative voltage, commonly referred to as the threshold voltage and ordinarily designated by the symbol $V_T$. A typical value of $V_T$ is approximately −2volts. Also contemplated as falling within the scope of the present invention are n-channel type MOS and silicon field effect transistors including the enhancement type and the depletion type transistors.

Figure 1:
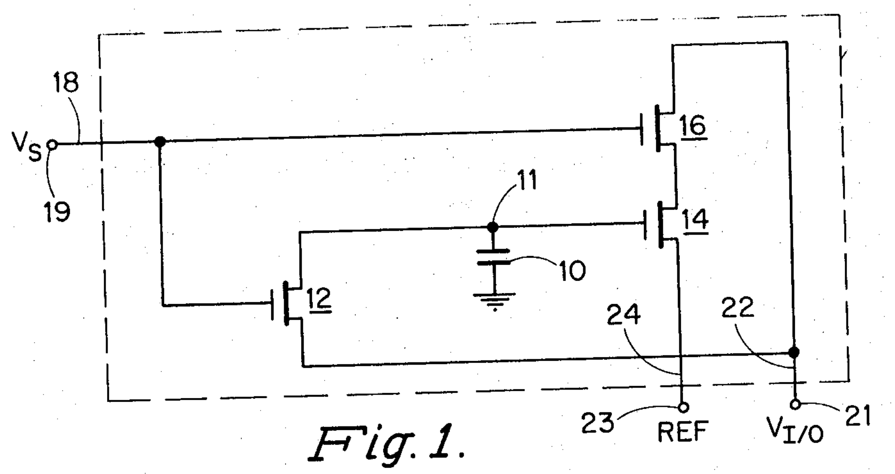
FIG. 1 is a circuit diagram illustrating a memory cell in accordance with the principles of the invention.

FIG. 1 illustrates a memory storage element 8 in accordance with the principles of the invention. Memory element or cell 8 includes three transistors 12, 14, and 16 connected in circuit with a single selection line 18, a single input/output line 22 and a reference line 24. Line 18 is coupled to receive selection voltage $V_S$ at control terminal 19, line 22 is coupled to provide or receive the voltage $V_{I/O}$ at terminal 21, and line 24 is coupled to receive a reference voltage at control terminal 23. As shall be discussed a reference voltage provided at control terminal 23 may be at either circuit ground potential or may be the reference voltage $V_A$.

Transistors 12, 14 and 16 of memory element 8 are connected as follows. The gate electrodes of transistors 12 and 16 are coupled to line 18. The source electrode of transistor 12 and the drain electrode of transistor 16 are coupled to line 22. The source electrode of transistor 16 is coupled to the drain electrode of transistor 14. The source electrode of transistor 14 is coupled to line 24. The drain electrode of transistor 12 and the gate electrode of transistor 14 are coupled together to form a node 11. Coupled to node 11 is a capacitor 10 which typically is the parasitic capacitance associated with transistors 12 and 14. Thus one end of capacitor 10 is coupled to node 11 whereas the other end of capacitor 10 is coupled to the substrate of the cell in an integrated circuit environment. It should be understood that the drain and source electrodes of either or all of the transistors may be interchanged.

In general, the operation of memory element 8 is as follows. Line 22 is precharged to a negative potential. If a charge, hereinafter referred to as a binary 1 or logical one, is stored in capacitor 10, ten during a read cycle, line 22 will assume the reference potential at control terminal 23. A change in voltage will thus occur on line 22 indicating that a logical one is stored in the element 8. If no charge, hereinafter referred to as a binary or logical zero, is stored in capacitor 10, then line 22 will maintain its precharged voltage. During a write cycle, line 22 receives a ground potential if a logical zero is to be stored in element 8. If a logical one is to be stored in element 8, then line 22 receives a negative voltage. During this write cycle, the voltage on capacitor 10 approaches the voltage level placed on line 22 thereby storing the logical condition desired. The write cycle may also include a refresh cycle either in a portion of the write cycle or overlapping the write cycle. The refresh is provided by a flip-flop whose input is coupled to line 22 and whose inverted output is recoupled to line 22. With this arrangement the voltage at node 11 is restored to that level originally stored just before the read cycle.

Figure 2:
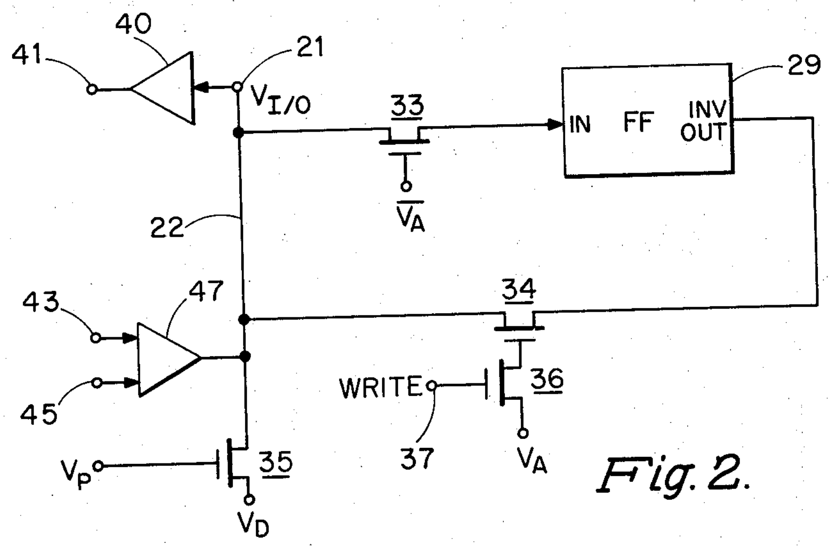
FIG. 2 is a circuit diagram illustrating logic circuits which may be utilized with the memory cell of FIG. 1.
Figure 3:
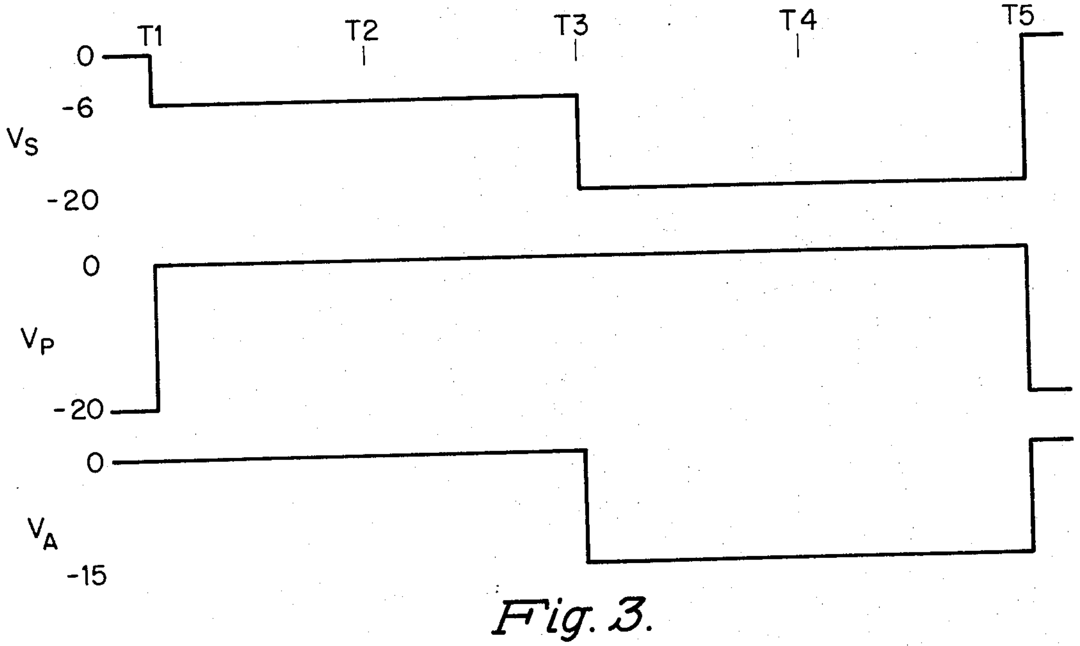
FIG. 3 illustrates timing diagrams of the reference voltages which may be used with the operation of the memory cell of FIG. 1.

More specifically, and with reference to FIG. 3, the operation of the memory element 8 in FIG. 1 will now be discussed. Before time T1, reference $V_S$ is zero volts and reference $V_P$ is −20 volts. For this discussion let us assume that the reference voltage at terminal 23 is at circuit ground potential or zero volts. Note that the operation between times T1 and T3 would be the same even if reference $V_A$ were connected to terminal 23 since $V_A$ is also zero volts during this time. Voltage $V_P$ is coupled to a transistor which is common to a plurality of elements 8. Such a transistor is shown in FIG. 2 as transistor 35. Voltage $V_P$ is coupled to the gate electrode of transistor 35, voltage $V_D$ which may be at −20 volts is coupled to the source electrode of transistor 35 and drain electrode of transistor 35 is coupled to control terminal 21. With $V_P$ equal to −20 volts, transistor 35 is turned on thereby impressing a voltage of approximately −15 volts on line 22. At time T1, reference $V_P$ goes to zero volts turning transistor 35 off. A −15 volt level will remain on line 22 however, because of the distributed capacitance associated with line 22. At time T1 references $V_S$ changes to −6 volts and remains there until time T3. Times T1 and T3 inclusive may be referred to as the read cycle, whereas times T3 to T5 inclusive may be referred to as the write cycle. With $V_S$ at −6 volts and assuming that a logical one is stored in capacitor 10, a voltage of approximately −7 volts will exit at node 11. Under these conditions, transistor 12 will remain turned off. With zero volts at the source electrode of transistor 14, a voltage −7 volts at the gate electrode of transistor 14 will turn transistor 14 on thereby providing a negative voltage at the drain electrode as well as the source electrode of transistors 14 and 16, respectively. With −15 volts on the drain electrode of transistor 16 and −6 volts at the gate electrode of transistor 16, transistor 16 will also turn on. With transistors 14 and 16 both on, a path will be produced between terminals 21 and 23 and accordingly line 22 will charge to the zero volt level of the reference at control terminal 23. The change in voltage will be sensed at control terminal 21 which in FIG. 2 is shown connected to a sense amplifier 40 coupled to an output terminal 41.

If a logical zero is stored in memory element 8, then the operation during the read cycle is as follows. Transistor 12 remains off. Although transistor 16 is capable of enabled for conduction, transistor 14 will not conduct because zero volts is impressed on its gate electrode. Accordingly, a path is not provided between terminals 21 and 23 and the voltage on line 22 remains at approximately −15 volts. The absence of a change in voltage is sensed at terminal 41 is indicative of a logical zero stored in memory element 8.

The operation of element 8 will now be specifically discussed for the write cycle which occurs between times T3 and T5. The immediately following discussion will be based on operation of the cell only, i.e., no attempt to actually write or restore is made or discussed. A reference voltage at terminal 23 is for purposes of the present discussion considered to be zero volts. With a logical one stored in capacitor 10, at time T3, voltage $V_S$ changes from −6 volts to approximately −20 volts, and transistor 12 turns on, since its drain electrode is approximately −7 volts and its source electrode is at approximately zero volts. Capacitor 10 thus charges to the zero voltage potential on line 22. As previously pointed out, line 22 is at zero volts since during the read cycle with a logical one stored in capacitor 10, the path between terminals 21 and 23 caused line 22 to charge to the zero volt level of line 24. Also at this time with −20 volts on the gate electrode of transistor 16, transistor 16 is capable of conducting. Initially, at time T3, the gate electrode voltage of transistor 14 is approximately −7 volts which also renders transistor 14 capable of conducting. However substantially no current flows because the reference voltage at terminal 23 is zero volts and because the voltage on line 22 is also zero volts. Shortly after time T3 as the −7 volts at node 11 is charged to zero volts, transistor 14 is no longer capable of conducting. Thus it can be seen that during the write cycle the basic operation of the cell 8 causes the logical one stored in the capacitor 10 to be complemented to a logical zero. A circuit for restoring a logical one will be discussed hereinafter.

The write cycle also for the basic operation of the cell with a logical zero stored in capacitor 10 is as follows. At time T3, transistor 12 is turned on and a voltage of approximately −15 volts on line 22 is coupled via transistor 12 to produce a voltage of approximately −7 volts at node 11 thereby complementing the logical condition previously in storage dfring the read cycle. Transistor 16 also receives the −20 volts at its gate electrode and is therefore capable of conducting. Initially, at time T3, transistor 14 is not capable of conducting because the node 11 voltage is approximately zero volts. As the node 11 voltage increases from zero volts and exceeds the threshold level required to turn on transitor 14, that is, as it goes towards −7 volts, transistor 14 is also rendered capable of conducting. Accordingly, with approximately −15 volts at the drain electrode of transistor 16 and zero volts at the source electrode of transistor 14 as provided by the reference voltage at terminal 23, the −15 volts in line 22 will change towards zero volts unless control or regulation is provided for the voltage on line 22. If line 22 and therefore the source electrode of transistor 12 were allowed to charge toward zero volts, then the voltage at node 11 would start to go toward zero volts also. This would recomplement the logical condition stored.

Therefore, if the reference voltage at terminal 23 is to be zero, volts, regulation or conjrol line 22 must be provided during the write cycle when a logical zero had been previously stored as indicated during the previous read cycle. It should be noted that although this recomplementing would restore capacitor 10 to its previous storage condition, a recomplement would not occur during the write cycle with a logical one stored as sensed during the previous read cycle. Thus, when a restore operation is performed, it, i.e. the restore circuit, would have to be sensitive to the logical condition stored and restore accordingly. The regulation circuit is not shown but may be of any design which maintains line 22 at −15 volts so that the recomplementing sequence will not occur. Preferably, a control circuit for the voltage on line 22 may be provided by means of a circuit i combination with transistor 35 and its associated references. By allowing transistor 35 to be turned on during a write cycle but only when a logical zero had been secured during the previous read cycle, line 22 would remain at the −15 volt level because of reference $V_D$ applied to terminal 21.

The problem of providing such control or regulation during the write cycle is avoided by allowing a reference voltage at terminal 23 to be approximately −15 volts during the write cycle. The −15 volts of the reference at terminal 23 should be picked to be substantially equal to the indicated value of that negative voltage which will be initially precharged onto line 22 via transistor 35(FIG. 2). This reference voltage at terminal 23 may be shown as voltage $V_A$ in FIG. 3. Voltage $V_A$ is zero volts during the read cycle and accordingly the operation of the element 8 during the read cycle is the same as hereinbefore discussed. At time T3 and until time T5 the voltage $V_A$ is at the −15 volt level. Thus the operation of the element 8 during the write cycle and with the voltage $V_A$ applied to terminal 23 is as follows.

Assuming a logical one is stored in capacitor 10, at time T3, transistor 12 is turned on and the −7 volt level of capacitor 10 charges to the zero volt level on line 22. Also, transistor 16 is rendered capable of conducting because of the −20 volts on its gate electrode. Transistor 14 is also initially rendered capable of conducting because of the −7 volts on its gate electrode. Thus a small amount of current starts to flow through transistors 14 and 16 so that the voltage on line 22 starts going negative toward the −15 volts of reference $V_A$. However, this excursion in voltage on line 22 is transient in nature since the capacitor 10 quickly charges to the zero volt level and accordingly transistor 14 is turned off.

During the write cycle and with a logical zero stored in capacitor 10, that at time T3, when transistor 12 turns on, capacitor 10 charges toward the −15 volt level on line 22 and thus node 11 reaches a voltage of −7 volts. Also during this time since about −15 volts is on the drain electrode of transistor 16 and −20 volts is on the gate electrode thereof, transistor 16 is rendered capable of conducting. Transistor 14 is also rendered capable of conducting as the voltage at node 11 goes toward −7 volts and exceeds the threshold voltage of transistor 14. Transistors 14 and 16 are thus both rendered capable of conducting, however substantially no current flows since the voltage, $V_A$, at terminal 23, is approximately the same as the voltage on line 22. Accordingly the control or regulation as indicated above is eliminated and an improved operation is achieved.

The memory element of FIG. 1 is envisioned as being included in a matrix of such elements in row and column arrangement. For example, each row of rows of such memory elements 8 may be connected to a single sense amplifier such as that shown in FIG. 2 as amplifier 40, and each column of columns of such memory elements 8 may be connected to read and restore logic such as that also shown in FIG. 2. The logic, which has been previously discussed, for preconditioning line 22 is also shown in FIG. 2 and may be also common to colums of cells 8.

It has been noted above that if a logical one had been stored in element 8 and read during theread cycle, then at time T3 at the beginning of the write cycle, the logical one would be complemented and a logical zero would have been caused to have been stored in element 8. Likewise, if a logical zero had been stored in element 8 as read during the read cycle, then a logical one will have been stored once the write cycle had been commenced. Thus the information in the element 8 is destroyed each time a write cycle is commenced. During the write cycle it is therefore desirable to restore the logical state in element 8 as had been read during th read cycle. This is accomplished by the use of a well-known flip-flop circuit 29 which is coupled at its input to line 22 and which is coupled at its inverting output also to line 22. Thus if a zero volt condition is received by flip-flop circuit 29, then a negative voltage will be produced at its inverting output sufficient to cause −15 volts to again be impressed on line 22. If −15 volts is received at the input of flip-flop circuit 29 from line 22, then zero volts will be caused to be impressed on line 22 via the inverting output of flip-flop circuit 29. Flip-flop circuit 29 may be controlled by the use of timing transistors 33 and 34. Assuming transistor 36 is conducting, transistor 34 is turned on when reference $V_A$ goes to −15 volts at time T3. The complement of voltage $V_A$ ($\overline{V_a}$) turns on transistor 33. Thus prior to time T3, the voltage on line 22 is allowed to reach the input of flip-flop circuit 29. At time T3, transistor 33 is rendered non-conducting and transistor 34 is rendered conducting so that the inverted output may be applied to line 22. Thus if a logical one was initially stored in element 8, during the read cycle but after the initial portion thereof, line 22 would be at zero volts and via transistor 33, flip-flop circuit 29 will now have been switched so that its inverting output is about −20 volts. At the start of the write cycle with transistor 33 off and transistor 34 on, then the −20 volts, at the inverting output of flip-flop circuit 29 would via transistor 34, impress −15 volts on line 22 so that line 22 is at a −15 volt level. With −15 volts on line 22, during the read cycle, the capacitor 10 will charge to −7 volts thereby restoring the logical one. Similar action may be seen where a logical zero has been stored in element 8. That is, the −15 volt level on line 22 during the read cycle would be inverted or complemented to zero volts so that during the write cycle, capacitor 10 would be charged to zero volts thereby restoring the logical zero Transistor 36 in the discussion just above was assumed to be conducting, thereby allowing reference $V_A$ to be applied to the gate electrode of transistor 34. Thus when element 8 is to be refreshed, the WRITE signal at the gate electrode of transistor 36 must be sufficiently negative, for example, −20 volts. It can be seen that the restore and write cycles may occur between times T3 and T5 by inhibiting one circuit and allowing the other to operate or by dividing the time between T3 and T5 between the restore or refresh operation and the write operation. That is, between times T3 and T4, a refresh cycle may be initiated and between times T4 and T5 a write cycle may be initiated. The circuit of FIG. 2 illustrates that mode of operation in which the write cycle is overlayed with the refresh cycle within times T3 and T5. When it is desired to write between times T3 and T5, the WRITE signal at terminal 37 is set at zero volts thereby inhibiting conduction of transistor 36 as well as transitor 34. At this time the write amplifier 47 is activated. If a one is to be written in element 8, a signal is received at terminal 43 such that approximately −15 volts is impressed on line 22 via amplifier 47. If a zero is to be written in element 8, a signal is received at terminal 45 such that a zero volt level is impressed on line 22 via amplifier 47.

It should be noted that the three transitors 12, 14 and 16 which form the fundamental cell can be arranged, alternatively to the illustrated embodiment, with transistors 14 and 16 essentially interchanged. That is, the fundamental cell can be constructed with transistor 12 arranged as shown with its drain electrode connected to node 11, but with the gate electrode of transistor 14 connected to the selection line 18, and with the gate electrode of transistor 16 connected to the node 11. The source and drain electrode paths of transistors 14 and 16 remain in series with each other between the reference at terminal 23 and the input/output line 22, as in FIG. 1. This alternative arrangement of the cell operates in the same manner as the FIG. 1 cell.

From the foregoing discussion, it is seen that the advantages and objects of the present invention are readily obtained. The present memory element provides a storage means having a minimum number of transitors and a reduced number of external connections. It should further be understood that a memory element following the principles of FIG. 1 may be modified in a number of ways. The preceding description has been of a preferred embodiment of the present invention. Various changes and modifications will be apparent to those skilled in the art. Therefore, this invention is to be interpreted not by the specific disclosure herein, but only in view of the appended claims.

Having now described the invention, what is claimed as new and for which it is desired to secure Letters Patent is:

1. An electronic memory storage element for connection to a single input/output line and a single selection line, said element comprising:

A. a first transistor having first, second and third electordes, wherein said first electrode is coupled to said selection line, said second electrode is coupled to said input/output line and said third electrode is coupled to a common storage node;

B. a second transistor having first, second and third electrodes, wherein said first electrode is coupled to said common storage node and said second electrode is coupled to a first reference line;

C. a third electrode having first, second and third electrodes, wherein said first electrode is coupled to said selection line, said second electrode is coupled to the third electrode of said second transistor and said third electrode is coupled to said input-/output line.

2. An electronic memory storage element as defined in claim 1 further comprising element selection means coupled to said selection line and means, coupled to said input/output line, for reading information from and writing information into said element.

3. An electronic memory storage element as defined in claim 1 wherein said first, second and third transistors are of the field effect type and wherein each of said first electrodes is a control electrode.

4. An electronic memory storage element as defined in claim 3 wherein said third electrode of said first transistor includes an inherent capacitance associated therewith and said first electrode of said second transistor also includes an inherent capacitance associated therewith, so that said common storage node is adapted to assume either of two voltage ranges indicative of a binary data state.

5. An electronic memory storage element having a first terminal for connection to an input/output line, a second terminal for connection to a selection line, a third terminal for connection to a first reference, and a common storage node, said element comprising:

A. a first transistor having first, second and third electrodes, wherein said first electrode is coupled to said second terminal, said second electrode is coupled to said first terminal, and said third electrode is coupled to said node;

B. a second transistor having first, second and third electrodes, wherein said first electrode is coupled to said node; and C. a third transistor having first, second and third electrodes, wherein said first electrode is coupled to said second terminal and wherein said second and third electrodes of said second and third transistors are arranged so that said second and third transistors are connected in series between said first terminal and said third terminal, and wherein the inherent capacitance associated with said common storage node is capable of data storage.

6. An element as defined in claim 5 wherein

A. said transistors are of the field effect type;

B. said cell supported by a substrate; and

C. said inherent capacitance is coupled between said node and said substrate.

7. An element as defined in claim 6 further comprising means for preseting said input/output line to a selected voltage level before said element is operated upon.

8. An element as defined in claim 6 wherein said first reference has a voltage level substanially equal to the voltage level of said substrate.

9. An element as defined in claim 6 further comprising means coupled to said input/output line for restoring data in said element.

10. An element as defined in claim 9 wherein said means for restoring data includes flip-flop circuit means coupled to complement the state of a voltage received from said input/output line during the reading of data from said e/ement and coupled to impress said complemented voltage on said input/output line during the restoring of data in said element.

11. An elemeent as defined in claim 6 further comprising means coupled to said input/output line for writing data into said element.

12. An element as defined in claim 11 further comprising means coupled to said input/output line for reading data stored in said element.

13. An element as defined in claim 6 wherein said first reference has a first voltage level during the reading of data from said element and a second voltage level during the writing of data into said element.

14. An element as defined in claim 13 wherein said second voltage level is approximately equal to the voltage level on said input/output line before said element is operated upon.

15. An electronic memory storage element for connection to a single input/output line and a single selection line and adapted to be coupled to a sense amplifier during a read interval and a digit driver during a write interval, said element comprising:

A. a first transistor having first, second and third electrodes, wherein said first electrode is coupled to said selection line, said second electrode is coupled to said input/output line and said third electrode is coupled to a common storage node;

B. a second transistor having first, second and third electrodes, wherein said first electrode is coupled to said common storage node and said third electrode is coupled to said input/output line; and C. a third transistor having first, second and third electrodes, wherein said first electrode is coupled to said selection line, said second electrode is coupled to a first reference and said third electrode is coupled to the second electrode of said second transistor and wherein the inherent capacitance associated with said common storage node is capable of assuming two voltage ranges each indicative of a binary state of data.

16. A memory cell for an MOS random-access integrated circuit memory which utilizes a single selection line, a single input/output line and a reference line, said cell comprising:

A. a capacitor adaptable for storing an electrical change;

B. a first MOS device having a gate terminal and at least two other terminals, said gate terminal coupled to said selection line, one of said other terminals coupled to said input/output line and the other of said terminals coupled to said capacitor;

C. a second MOS device having a gate terminal and at least two other terminals, said gate terminal coupled to said capacitor and one of said other terminals coupled to said reference line; and D. a third MOS device having a gate and two other terminals, said gate terminal coupled to said selection line, one of said other terminals coupled to said input/output line and the other of said other terminals coupled to said other of said other terminals of said second MOS device.

17. A cell as defined in claim 16 wherein said other of said other terminals of said first MOS device is connected to said gate of said second MOS device and said capacitor includes a parasitic capacitance between said connection and a substrate supportint said cell.

18. A memory unit comprising a data input/output terminal, capacitive data storing means, a refernce terminal, a first, second, and third switching devices each having an output circuit and a control terminal, the output circuits of said first and second switching devices being connected in series between said reference terminal and said input/output terminal, said capacitive data storing means being connected between the control terminal of said first switching device and a first potential source, the output circuit of said third switching device being connected between said input/output terminal and the control terminal of said first switching device, the control terminals of said second and third switching devices being adapted to be connected to receive a control signal.

19. A memory unit as defined in claim 18 in which said switching devices are field effect transistors having a gate electrode defining said control terminal.

20. A memory unit as defined in claim 18 in which said first potential source is the potential of a substrate supporting said cell.

* * * * *